(12) United States Patent
Hards et al.

(10) Patent No.: US 9,577,269 B2
(45) Date of Patent: Feb. 21, 2017

(54) THIN FILM CATALYTIC MATERIAL FOR USE IN FUEL

(71) Applicants: Graham Alan Hards, Berkshire (GB); Ian Roy Harkness, Oxford (GB); Michael Ian Petch, Berkshire (GB); Jonathan David Brereton Sharman, Berkshire (GB); Edward Anthony Wright, Oxfordshire (GB); Alexander Martin Willcocks, London (GB)

(72) Inventors: Graham Alan Hards, Berkshire (GB); Ian Roy Harkness, Oxford (GB); Michael Ian Petch, Berkshire (GB); Jonathan David Brereton Sharman, Berkshire (GB); Edward Anthony Wright, Oxfordshire (GB); Alexander Martin Willcocks, London (GB)

(73) Assignee: JOHNSON MATTHEY FUEL CELLS LIMITED, London (GB)

( * ) Notice: Subject to any disclaimer, the term of this patent is extended or adjusted under 35 U.S.C. 154(b) by 118 days.

(21) Appl. No.: 14/384,506

(22) PCT Filed: Mar. 28, 2013

(86) PCT No.: PCT/GB2013/050815
§ 371 (c)(1),
(2) Date: Sep. 11, 2014

(87) PCT Pub. No.: WO2013/144631
PCT Pub. Date: Oct. 3, 2013

(65) Prior Publication Data
US 2015/0086902 A1    Mar. 26, 2015

(30) Foreign Application Priority Data

Mar. 30, 2012 (GB) .................................. 1205691.7
Jun. 29, 2012 (GB) .................................. 1211560.6

(51) Int. Cl.
*H01M 8/10* (2016.01)
*H01M 4/86* (2006.01)
*H01M 4/88* (2006.01)
*H01M 4/90* (2006.01)
*H01M 4/92* (2006.01)

(52) U.S. Cl.
CPC ......... *H01M 4/8652* (2013.01); *H01M 4/8657* (2013.01); *H01M 4/8814* (2013.01); *H01M 4/9041* (2013.01); *H01M 4/9075* (2013.01); *H01M 4/92* (2013.01); *H01M 4/925* (2013.01); *H01M 8/1004* (2013.01); *H01M 2008/1095* (2013.01)

(58) Field of Classification Search
CPC .... H01M 4/8652; H01M 4/92; H01M 4/9075; H01M 4/9041; H01M 4/925; H01M 4/8657; H01M 4/8814; H01M 8/1004; H01M 2008/1095; Y02E 60/521
USPC ................ 429/482, 523, 524, 525, 526, 527
See application file for complete search history.

(56) References Cited

U.S. PATENT DOCUMENTS

| | | |
|---|---|---|
| 2005/0112450 A1 | 5/2005 | Wang et al. |
| 2006/0135359 A1 | 6/2006 | Adzic et al. |
| 2011/0165496 A1 | 7/2011 | Shirvanian |
| 2012/0046161 A1 | 2/2012 | Ball et al. |

FOREIGN PATENT DOCUMENTS

| | | |
|---|---|---|
| CN | 1954392 | 4/2007 |
| EP | 1 021 246 B1 | 7/2000 |
| WO | 2005/020356 A1 | 3/2005 |
| WO | 2005-084399 | 9/2005 |
| WO | 2007/061945 A2 | 5/2007 |
| WO | 2012/080726 A1 | 6/2012 |
| WO | 2013/045894 A1 | 4/2013 |

OTHER PUBLICATIONS

Chien-Te Hsieh et al. "Preparation of Pt Co nanocatalysts on carbon nanotube electrodes for direct methanol fuel cells", Diamond and Related Materials, Elsevier Science Publishers, Amsterdam, NL, vol. 20, No. 7, Oct. 12, 2010 (Oct. 12, 2010), pp. 1065-1071, XP028245214, ISSN: 0925-9635, DOI: 10.1016/J. Diamond.2010. 0.009 [retrieved on Apr. 19, 2011] Y p. 1067, right-hand column, paragraph 1 figure 3 table 1.
International Search Report, dated Jul. 5, 2013, from corresponding PCT application.
CN Office Action, dated Oct. 10, 2015; Application No. 201380018286.X.

*Primary Examiner* — Colleen Dunn
*Assistant Examiner* — Haytham Soliman
(74) *Attorney, Agent, or Firm* — Young & Thompson

(57) ABSTRACT

A catalytic material includes (i) a support material and (ii) a thin film catalyst coating having an inner face adjacent to the support material and an outer face, the thin film catalyst coating having a mean thickness of ≤8 nm, and wherein at least 40% of the support material surface area is covered by the thin film catalyst coating; and wherein the thin film catalyst coating includes a first metal and one or more second metals, and wherein the atomic percentage of first metal in the thin film catalyst coating is not uniform through the thickness of the thin film catalyst coating.

19 Claims, No Drawings

THIN FILM CATALYTIC MATERIAL FOR USE IN FUEL

BACKGROUND OF THE INVENTION

Field of the Invention

The present invention relates to a novel catalytic material, to a catalyst layer comprising such a catalytic material and to its use as an electrode in an electrochemical device, in particular a fuel cell, such as a proton exchange membrane fuel cell.

Description of the Related Art

A fuel cell is an electrochemical cell comprising two electrodes separated by an electrolyte. A fuel, such as hydrogen or an alcohol such as methanol or ethanol, is supplied to the anode and an oxidant, such as oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often, the electrolyte is a solid polymeric membrane, in which the membrane is electronically insulating but ionically conducting. In the proton exchange membrane fuel cell (PEMFC), the membrane is proton conducting, and protons, produced at the anode, are transported across the membrane to the cathode, where they combine with oxygen to form water. Alternatively, the electrolyte is a liquid or molten ion-conducting electrolyte, such as phosphoric acid, as used in a phosphoric acid fuel cell (PAFC).

A principal component of the PEMFC is the membrane electrode assembly (MEA) which is essentially composed of five layers. The central layer is the polymer ion-conducting membrane. On either side of the ion-conducting membrane there is an electrocatalyst layer, containing an electrocatalyst designed for the specific electrochemical reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

Electrocatalysts for fuel oxidation and oxygen reduction are typically based on platinum or platinum alloyed with one or more other metals. The platinum or platinum alloy catalyst can be in the form of unsupported nanometer sized particles (such as metal blacks or other unsupported particulate metal powders) or can be deposited as even higher surface area particles onto a conductive carbon substrate, or other conductive material (to form a supported catalyst).

The MEA can be constructed by several methods. The electrocatalyst layer may be applied to the gas diffusion layer to form a gas diffusion electrode. Two gas diffusion electrodes can be placed either side of an ion-conducting membrane and laminated together to form the five-layer MEA. Alternatively, the electrocatalyst layer may be applied to both faces of the ion-conducting membrane to form a catalyst coated ion-conducting membrane. Subsequently, gas diffusion layers are applied to both faces of the catalyst coated ion-conducting membrane. Finally, an MEA can be formed from an ion-conducting membrane coated on one side with an electrocatalyst layer, a gas diffusion layer adjacent to that electrocatalyst layer, and a gas diffusion electrode on the other side of the ion-conducting membrane.

Typically tens or hundreds of MEAs are required to provide enough power for most applications, so multiple MEAs are assembled to make up a fuel cell stack. Field flow plates are used to separate the MEAs. The plates perform several functions: supplying the reactants to the MEAs, removing products, providing electrical connections and providing physical support.

Existing state of the art electrocatalysts used in fuel cells are typically made from platinum or platinum alloys supported on conducting high surface area carbon supports. The carbon allows a high surface area of platinum to be created typically in the form of discrete nano-particles of approximately spherical geometry. The carbon support also forms a porous layer such that gaseous reactants and liquid products, or liquid reactants and gaseous products, can move to and from the electrocatalytic nano-particles. In real operational conditions, particularly at the cathode of a fuel cell where the oxygen reduction reaction occurs, a number of problems arise with carbon supported catalysts including corrosion of the carbon support and dissolution and sintering of the platinum or platinum alloy catalyst particles leading to loss of performance. A further, and more important, problem with such catalysts is that the amount of platinum needed for sufficient power output from a stack is considered too high for economic application in cost critical areas such as automotive drive trains. Therefore, of particular need, are improved catalysts for the oxygen reduction reaction that takes place at the cathode of the fuel cell. Although the existing nano-particulate platinum particles supported on carbon have high platinum surface area (surface area per unit mass of platinum—$m^2/g$) typically greater than 50 $m^2/g$, the surface has a low intrinsic surface specific activity (activity in terms of current generated per unit area of catalyst surface—$\mu A/cm^2$) when they are equal to or less than about 3 nm in diameter (M. Shao, A. Peles, K. Shoemaker, Nano Letters, 11, 3714-3719 (2011)). This results in the overall mass activity in terms of current generated per unit mass of platinum (A/mg) being lower than required. In addition, particles of this size have poor resistance to potential cycling and can both dissolve and sinter rapidly. Also typically with the state-of-the-art catalysts, a high proportion of the carbon support surface area remains uncovered which can be oxidised, causing degradation of the catalyst, at the high potentials that occur on the cathode during routine operation and at the even higher potentials that can occur during start up and shut down periods.

One of the contributions to the low surface specific activity and to the poor stability of small platinum particles is the high number of atoms in low co-ordination sites. An atom at a low co-ordination site has fewer bonds to other platinum (metal) atoms. For example, for an octahedron, the atoms at the corners have only four near neighbours (co-ordination number is 4), atoms at an edge have seven and atoms within the (111) plane have nine near neighbours. For a small octahedron, there is a higher proportion of corner and edge sites compared to a large octahedron. Atoms at low co-ordination sites are more vulnerable to dissolution because they are not as strongly bound to the solid particle. They are also able to bond more strongly to oxygen, which means it is harder to carry out the oxygen reduction reaction; the metal tends to form an oxide rather than water.

When the particles are larger than 3 nm in diameter they are more stable and have a lower proportion of low co-ordination atoms, thus having a higher specific surface activity. However, since the surface area is lower, they typically have a lower mass activity. Since only the surface of the particle can act electrocatalytically the majority of the valuable platinum metal within the particle is not used.

Alternative structures, such as the acicular structures of platinum supported on polymer fibrils as disclosed in EP 1 021 246 B1 have been proposed as suitable alternative catalysts for the oxygen reduction reaction. These catalysts can have higher specific activities than state-of-the-art nanoparticulate catalysts, but because the surface area to volume ratio of the platinum structures is still low and the platinum surface areas are therefore also low (typically around 10 $m^2/g$ platinum) (Handbook of Fuel Cells—Fundamentals, Technology and Applications, Volume 3: Fuel Cell Technology and Applications, pages 576-589), the mass activity is not sufficiently improved.

Therefore, there remains the need for improved catalysts which demonstrate higher mass activity than the current designs and which are also stable to both dissolution and sintering of the platinum, and support corrosion. It is therefore the object of the present invention to provide an improved catalytic material for use in electrochemical devices, in particular a fuel cell. The catalytic material has improved mass activity over state-of-the-art catalysts. In addition, the catalytic material has improved stability to dissolution and sintering and support corrosion.

SUMMARY OF THE INVENTION

The present invention provides a catalytic material comprising (i) a support material and (ii) a thin film catalyst coating having an inner face adjacent to the support material and an outer face, the thin film catalyst coating having a mean thickness of ≤8 nm, and wherein at least 40% of the support material surface area is covered by the thin film catalyst coating; and wherein the thin film catalyst coating comprises a first metal and one or more second metals, and wherein the atomic percentage of first metal in the thin film catalyst coating is not uniform through the thickness of the thin film catalyst coating.

Alternatively, the present invention provides a catalytic material comprising (i) a support material and (ii) a thin film catalyst coating having an inner face adjacent to the support material and an outer face, the thin film catalyst coating having a surface area of at least 25 $m^2/g$, and wherein at least 40% of the support material surface area is covered by the thin film catalyst coating; and wherein the thin film catalyst coating comprises a first metal and one or more second metals, and wherein the atomic percentage of first metal in the thin film catalyst coating is not uniform through the thickness of the thin film catalyst coating.

DETAILED DESCRIPTION OF THE INVENTION

The thin film catalyst coating comprises a first metal, wherein the first metal is suitably selected from the platinum group metals (platinum, palladium, rhodium, ruthenium, iridium and osmium), or an oxide thereof. Suitably, the first metal is selected from the group platinum, palladium, rhodium, ruthenium and iridium; more preferably platinum, ruthenium or iridium; more preferably platinum or iridium; and most preferably platinum The thin film catalyst coating further comprises one or more (suitably one or two) second metals which are different to the first metal and wherein the one or more second metals are selected from the group consisting of transition metals (suitably chromium, cobalt, nickel, zinc, yttrium, niobium, tin, tantalum, scandium, palladium, iridium, lanthanum, copper, titanium, silver, gold, rhodium, platinum, tungsten, osmium, vanadium, ruthenium, iron), rare earth metals (suitably cerium and gadolinium), alkali metals (suitably sodium, potassium), alkaline earth metals (suitably calcium, strontium), Group IVA metals (suitably lead) and Group VA metals (suitably bismuth); or an oxide thereof. More suitably, the one or more second metals are selected from the group consisting of chromium, cobalt, nickel, zinc, yttrium, niobium, tin, tantalum, scandium, palladium, iridium, lanthanum, copper, titanium, silver, gold, rhodium, osmium, vanadium, ruthenium, iron, cerium, gadolinium, sodium, potassium, calcium, strontium, lead, and bismuth.

The exact choice of first and second metal will depend on the reaction for which the catalytic material is to be used. For example:

(i) Oxygen Reduction Reaction:
First metal is suitably platinum.
Second metal is suitably one or more of nickel, cobalt, chromium, yttrium, gadolinium, scandium, palladium, iridium, lanthanum, copper, iron and zinc.

(ii) Oxygen Evolution Reaction:
First metal is suitably iridium or ruthenium.
Second metal is suitably one or more of tantalum, titanium, niobium, iridium, ruthenium, tin, silver, gold, calcium, bismuth, strontium, lead, vanadium, sodium, potassium and cerium.

(iii) Hydrogen Evolution Reaction:
First metal is suitably platinum, rhodium, palladium, ruthenium or iridium.
Second metal is suitably one or more of rhodium, platinum, ruthenium, palladium, iridium, osmium, cobalt, vanadium, or tungsten.

(iv) Methanol Oxidation Reaction:
First metal is suitably platinum.
Second metal is suitably one or more of ruthenium, osmium, niobium, tantalum, vanadium, iridium, tin, yttrium or titanium.

(v) Hydrogen oxidation (particularly in the presence of carbon monoxide)
First metal is suitably platinum
Second metal is suitably one or more of osmium, ruthenium, niobium, tantalum, vanadium, iridium, tin, yttrium, titanium or rhodium.

Suitably, the thin film catalyst coating is an alloy of the first metal and the one or more second metals. By the term 'alloy' we mean that there is at least some intimate mixing between the first metal and the one or more second metals in the thin film catalyst coating, but the intimate mixing is not uniform throughout the thin film catalyst coating. Thus, the composition (atomic percentage of each of the first metal and second metal) varies throughout the thin film catalyst coating, and suitably varies across the thickness of the thin film catalyst coating. The composition of the thin film catalyst coating refers to the atomic percentages of each of the first and second metals.

In one embodiment, the atomic percentage of the first metal at the outer face of the thin film catalyst coating is 50-100 at % and therefore the thin film catalyst coating contains more of the first metal compared to the second metal at the outer face.

In a second embodiment, the atomic percentage of the first metal at the outer face of the thin film catalyst coating is greater than the atomic percentage of the first metal at the inner face of the thin film catalyst coating.

The thin film catalyst coating can be applied to the support material by a number of methods including, but not limited to, vacuum techniques including plasma assisted, gas phase techniques including plasma assisted, electrochemical techniques or chemical deposition. In particular, the following techniques may be used: atomic layer deposition, electrodeposition, electrophoresis, chemical vapour deposition, physical vapour deposition, plasma assisted deposition techniques, sputtering and evaporation.

Atomic layer deposition is a particularly preferred technique. Atomic layer deposition using alternating pulses of the first and second metals allows the required graduation across the thickness of the thin film catalyst coating to be created. By optimising the pulse sequence, the appropriate non-uniformity of the atomic percentages of the first and second metals in the thin film catalyst coating is achieved. It is possible to optimise the pulse sequence such that the outer face is pure first metal and/or the inner face is pure second metal.

The thin film catalyst coating suitably has a mean thickness of ≤8 nm and suitably has a mean thickness of ≤6 nm, preferably ≤5 nm. The thin film catalyst coating suitably has a mean thickness ≥0.5 nm, preferably ≥1 nm and most preferably ≥2 nm. The mean thickness of the coating is determined by techniques known to those in the art, for example by taking a number of measurements across the thin film catalyst coating and calculating the mean average.

The thin film catalyst coating suitably has a surface area of at least 25 m²/g, more suitably at least 40 m²/g, preferably at least 50 m²/g. The surface area is determined by known techniques, such as adsorption of gases onto the surface. For example carbon monoxide can be used to measure the surface area of platinum by knowing how many molecules of carbon monoxide adsorb onto each platinum atom and measuring the quantity of molecules adsorbed onto a known weight of platinum present in the sample.

The form of the thin film catalyst coating exists as elements that may be of various different geometries, but all characterised by the elements of the film having a lateral dimension that is greater than the thickness direction. The perimeter of the elements may be of circular, rectangular, hexagonal or other known geometrical shape or be irregular in perimeter shape. The elements may be discrete, with no contact between neighbouring elements, or they may be touching or definitely connected to neighbouring elements such that one element merges into others. Where complete merging of the elements has occurred, the thin film of the invention is continuous. In any one catalytic material based on the invention, different arrangements of the elements may be combined such that there are areas on the support material that are covered with a thin continuous film, areas with discrete elements and areas with merged or partially merged elements. In some cases the thickness of each element is uniform across its extent, but the thickness may vary, for example the thickness at the perimeter of the element may be less than in the middle such that the element appears domed. Merging of such domed elements may lead to coverage of the support material with an undulating thin film, which may be continuous, covering all of the support material, or discontinuous, or vary across the surface of the support material.

Suitably, at least 50%, more suitably at least 60%, even more suitably at least 75%, preferably at least 90% and most preferably at least 95% of the surface area of the support material is covered by the thin film catalyst coating. In one embodiment, 100% of the surface area of the support material is covered by the thin film catalyst coating, such that none of the support material remains visible. The extent of coverage of the surface area of the support material may be determined by comparing total surface area of the support material prior to application of the thin film catalyst coating ($a_s$) with the total surface area of the catalytic material ($a_c$) (surface area of thin film catalyst coating plus surface area of remaining uncoated support material) and independently measuring the surface area of the thin film catalyst coating ($a_p$) on the support material. The percentage coverage of the support material ($C_s$) is thus calculated from:

$$C_s = \left[1 - \left(\frac{a_c - a_p}{a_s}\right)\right] * 100$$

These values are readily determined using nitrogen adsorption measurements (e.g. BET method) to measure the values for $a_s$ and $a_c$ and using carbon monoxide adsorption for the surface area of the thin film catalyst coating ($a_p$).

The support material may be any material that is suitable for use in the present invention. Suitably, the support material is resistant to corrosion when the catalytic material is used under fuel cell operating conditions.

In one embodiment, the support material is a fibre. The fibre is suitably carbon (e.g. made from a carbonisable polymer, such as polyacrylonitrile, polyimide, cellulose), a polymer (e.g. polybenzimidazole, polyimide, polytetrafluoroethylene (PTFE)), a metal oxide (e.g. a conductive metal oxide, such as doped titanium oxide or doped tin oxide), a conductive mixed metal oxide (e.g. as disclosed in PCT patent application no. PCT/GB2011/052472), a metal nitride (e.g. a conductive nitride, such as titanium nitride), a metal carbide (e.g. a conductive metal carbide, such tungsten carbide, titanium carbide) or a metal. These fibres may be produced by electrospinning, force spinning, rotary jet spinning, melt spinning and other conventional techniques known to those skilled in the art for making fibres. Suitably, the fibre support material has a length greater than 0.5 μm, more suitably 1 μm, preferably 3 μm and a high aspect ratio. The maximum length of the fibres will be dependent on the nature of the fibre and the process by which they are produced. By 'high aspect ratio' is meant the length is considerably greater (for example at least 6 times, suitably at least 15 times and preferably at least 30 times) than the cross-sectional dimensions. Suitably, the greatest cross-sectional dimension of the fibre support material is in the range of 30 to 500 nm, suitably 30 to 200 nm and preferably 30 to 100 nm.

In a second embodiment, the support material is a particulate. The particulate may be a carbon particle, for example a commercially available high surface area carbon black (such as available from Cabot Corp (Vulcan XC72R) and Akzo Nobel (Ketjen black series)) or a graphitised version of these carbon blacks or other commercially available carbon blacks such as acetylene blacks (e.g. those available from Denka). The carbon may also be one specifically designed for use in a fuel cell such as those described in International patent application No. PCT/GB2012/052306. Alternatively, the particulate may be a metal oxide (e.g. titania, zirconia, silica or a mixed oxide, in particular a conductive mixed oxide such as niobia-doped titania, phosphorous-doped tin oxide and mixed platinum group metal oxides or mixed metal oxides as disclosed in International patent application no. PCT/GB2011/052472), a carbide (e.g. tungsten carbide or titanium carbide), a nitride, in particular a conductive nitride, (e.g. titanium nitride or titanium aluminium nitride).

In some embodiments, the support material itself may have catalytic activity for a different catalytic reaction to the thin film catalyst coating and in this case, it is preferred that the thin film catalyst coating does not completely cover the support material, but is absent in some places such that the support material is visible. For example, the support material may be a conductive mixed metal oxide (as hereinbefore described) which acts as a catalyst for an oxygen evolution reaction.

In an embodiment, the catalytic material is formed using the deposition techniques hereinbefore described and is then subjected to conditions under which some, or all, of the one or more second metals in the thin film catalyst coating is removed, forming an outer surface of the thin film catalyst coating depleted in the one or more second metals. Removal of the one or more second metals is preferably carried out by chemical or electrochemical leaching methods or by heating in a controlled gaseous atmosphere, such as including but not limited to nitrogen, oxygen, hydrogen, carbon monoxide and nitrogen monoxide. For example, the coating is contacted with an acidic or alkaline solution to solubilize the one or more second metals or subjected to an electrochemical reaction during which the one or more second metals is dissolved in situ and removed from the surface of the coating. Thus, if the starting material is, for example, a PtX alloy, the component X is removed selectively, which will result in a platinum-rich surface on underlying layers of lower platinum content. The surface created in this way may have enhanced catalytic activity due to the electronic and structural influence of the underlying layers. One particular mechanism through which the activity may be enhanced is the formation of a strained metal lattice, comprising primarily the first metal at the outer surface, in which the lattice parameter of the thin film catalyst coating surface is somewhat smaller than the value for the pure first metal.

In a further embodiment, the catalytic material is formed using the deposition techniques hereinbefore described and is subjected to a subsequent treatment after its formation to change the structure of the thin film catalyst coating. This may be by heating in a controlled gaseous atmosphere, such as including but not limited to nitrogen, oxygen, hydrogen, carbon monoxide and nitrogen monoxide, to further reduce the number of low coordination metal atoms, or to otherwise change the morphology of the thin film catalyst coating on the surface of the support material, or to change the interaction between the first metal and second metal. Alternatively, electrochemically cycling the sample may also be used to promote further morphological changes to the thin film catalyst coating, such as sintering, and/or to cause dissolution and re-precipitation to occur such that the thin film catalyst coating is re-arranged into a form that has a higher specific surface activity and which is more stable during fuel cell operation.

It is possible that both of these previous two embodiments can be used one or more times in combination and in any sequence.

In a yet further embodiment of the invention, an interlayer is present between the support material and the thin film catalyst coating. Although the interlayer is not the thin film catalyst coating, it may in places be exposed (i.e. it is not completely covered by the thin film catalyst coating); alternatively, it is completely covered by the thin film catalyst coating and, in some cases, the thin film catalyst coating may extend beyond the interlayer such that the thin film catalyst coating is in direct contact with the support material. The interlayer may be selected from the group consisting of: a metal (e.g. tungsten, niobium, molybdenum, tantalum or gold); a metal nitride or mixed metal nitride (e.g. titanium nitride or titanium aluminium nitride); a metal oxide, including doped and mixed oxides (e.g. niobium-doped titania and mixed platinum group metal oxides (e.g. $IrRuO_x$ or those disclosed in PCT/GB2011/052472 hereinbefore described); carbon or boron-doped diamond.

The presence of an interlayer aids nucleation and deposition of the thin film catalyst coating on the substrate. An interlayer is also particularly useful if the support material has a very high surface area as it will help cover, fill or otherwise occlude a high proportion of the support material surface area that is comprised of internal micropores, prior to application of the thin film catalyst coating.

The thickness of the interlayer may depend on several factors, but is suitably at least 1 nm, preferably at least 2 nm. For example if the support material is not electrically conductive, the interlayer may perform this function and would be of sufficient thickness to provide good conductivity, the thickness depending on the intrinsic conductivity of the interlayer material. The interlayer may also have catalytic activity for a different catalytic reaction to the thin film catalyst coating. In this case, it is preferred that the thin film catalyst coating does not completely cover the interlayer, but is absent in some places such that the interlayer is exposed.

The interlayer can be applied to the support material by a number of methods including, but not limited to, vacuum techniques including plasma assisted, gas phase techniques including plasma assisted, electrochemical techniques or chemical deposition. In particular, the following techniques may be used: atomic layer deposition, electrodeposition, electrophoresis, chemical vapour deposition, physical vapour deposition, plasma assisted deposition techniques, sputtering and evaporation. A particularly preferred technique is atomic layer deposition.

The catalytic material may further comprise an additional catalyst component comprising a third and optionally one or more fourth metals, that is incorporated to promote a different catalyst reaction to that of the thin film catalyst coating. For example, when the thin film catalyst coating is active for the oxygen reduction reaction or the hydrogen oxidation reaction, the additional catalyst component may be active for the oxygen evolution reaction.

Suitably, the third metal is selected from the platinum group metals or an oxide thereof, preferably iridium or ruthenium.

The third metal may also be alloyed or mixed with one or more different fourth metals selected from the group consisting of transition metals (suitably, chromium, cobalt, nickel, zinc, yttrium, niobium, tin, tantalum, scandium, palladium, iridium, lanthanum, copper, titanium, silver, gold, rhodium, platinum, tungsten, osmium, vanadium, ruthenium, iron), rare earth metals (suitably cerium and gadolinium), alkali metals (suitably sodium, potassium), alkaline earth metals (suitably calcium, strontium), Group IVA metals (suitably lead) and Group VA metals (suitably bismuth); or an oxide thereof.

Preferably, the one or more fourth metals is tantalum, titanium, niobium, iridium, ruthenium, tin, silver, gold, calcium, bismuth, strontium, lead, vanadium, sodium, potassium and cerium.

The additional catalyst component can be deposited on, but not completely covering, the thin film catalyst coating. For example, the additional catalyst component can be applied to the thin film catalyst coating in such a form that sufficient of the thin film catalyst coating is still exposed. Alternatively, if the thin film catalyst coating does not completely cover the support material and/or interlayer, the additional catalyst component can be applied to the exposed support material and/or interlayer, between the elements of the thin film catalyst coating. The additional catalyst component is deposited by similar methods to those used to deposit the thin film catalyst coating and include a number of methods, not limited to, vacuum techniques including plasma assisted, gas phase techniques including plasma assisted, electrochemical techniques or chemical deposition. In particular, the following techniques may be used: atomic layer deposition, electrodeposition, electrophoresis, chemical vapour deposition, physical vapour deposition, plasma assisted deposition techniques, sputtering and evaporation.

The catalytic material of the present invention has use in a catalyst layer, for example for use in an electrode of an electrochemical cell, such as a fuel cell. Accordingly, a further aspect of the invention provides a catalyst layer comprising a plurality of catalytic materials of the invention. The catalytic material is formed into a layer by a number of methods known to those skilled in the art, for example by preparation of an ink and applying the ink to a membrane or gas diffusion layer or transfer substrate by standard methods such as printing, spraying, knife over roll, powder coating, electrophoresis etc. In an embodiment where the support material is an electrospun fibre, a pre-formed layer of the support material may be created, the thin film catalyst coating then being applied to the pre-formed layer of support material to provide a free-standing catalyst layer. The free-standing catalyst layer is then applied to a substrate (e.g. a membrane or gas diffusion layer) by a simple lamination process.

The catalyst layer may comprise more than one different type of catalytic material of the invention, the different types of catalytic material having the same catalytic function or having different catalytic functions. For example, the catalyst layer may comprise catalytic materials of the invention having different support materials and/or different thin film catalyst coatings. Some of the catalytic materials may comprise an interlayer and some may not. If more than one different type of catalytic material is used in the catalyst layer, the different catalytic materials may be mixed or may be in separate layers or a combination of the two.

The catalyst layer may comprise one or more catalytic materials of the invention and one or more conventional nano-particulate catalysts having the same or different catalytic functions. For example, when the catalytic material of the invention is used for the oxygen reduction reaction or the hydrogen oxidation reaction, the conventional catalyst component is active for the oxygen evolution reaction or vice versa.

If the form of the support material is fibrous or of high aspect ratio, then the catalytic material may be arranged isotropically (i.e. all the fibres aligned in the same direction) within the planar dimensions of a catalyst layer to increase the packing density of the material and reduce the porosity of the layer. It will be apparent that the isotropy can be varied from highly aligned to randomly aligned (anisotropic) according to the desired structure of the catalyst layer.

The thickness of the catalyst layer is suitably $\leq 100$ µm, more suitably $\leq 20$ µm, preferably $\leq 10$ µm and most preferably $\leq 5$ µm. Suitably, the thickness of the catalyst layer is $\geq 0.3$ microns, preferably $\geq 0.5$ microns.

The porosity of the catalyst layer is suitably $\geq 20\%$, preferably $\geq 40\%$ and most preferably between 50 and 70%.

The catalyst layer may also comprise additional components. Such components include, but are not limited to: a proton conductor (e.g. a polymeric or aqueous electrolyte, such as a polyfluorosulphonic acid (PFSA) polymer (e.g. Nafion®), a hydrocarbon proton conducting polymer (e.g. sulphonated polyarylene), or phosphoric acid); a hydrophobic (a polymer such as PTFE or an inorganic solid with or without surface treatment) or a hydrophilic (a polymer or an inorganic solid, such as an oxide) additive to control water transport; an additional catalytic material for example having activity for the decomposition of hydrogen peroxide (e.g. ceria or manganese dioxide).

If the catalytic material of the catalyst layer has not previously undergone heat treatment or electrochemical cycling before being formed into the catalyst layer, it may be beneficial to perform this treatment on the catalyst layer to reduce the number of low coordination metal atoms, or to otherwise change the morphology of the thin film catalyst coating.

A further aspect of the invention provides an electrode comprising a gas diffusion layer and a catalyst layer according to the present invention. Typical gas diffusion layers are suitably based on conventional non-woven carbon fibre gas diffusion substrates such as rigid sheet carbon fibre papers (e.g. the TGP-H series of carbon fibre papers available from Toray Industries Inc., Japan) or roll-good carbon fibre papers (e.g. the H2315 based series available from Freudenberg FCCT KG, Germany; the Sigracet® series available from SGL Technologies GmbH, Germany; the AvCarb® series available from Ballard Material Products, United States of America; or the NOS series available from CeTech Co., Ltd. Taiwan), or on woven carbon fibre cloth substrates (e.g. the SCCG series of carbon cloths available from the SAATI Group, S.p.A., Italy; or the WOS series available from CeTech Co., Ltd, Taiwan). For many PEMFC and direct methanol fuel cell (DMFC) applications the non-woven carbon fibre paper, or woven carbon fibre cloth substrates are typically modified with a hydrophobic polymer treatment and/or application of a microporous layer comprising particulate material either embedded within the substrate or coated onto the planar faces, or a combination of both to form the gas diffusion layer. The particulate material is typically a mixture of carbon black and a polymer such as polytetrafluoroethylene (PTFE). Suitably the gas diffusion layers are between 100 and 400 µm thick. Preferably there is a layer of particulate material such as carbon black and PTFE on the face of the gas diffusion layer that contacts the catalyst layer.

In PEMFC, the electrolyte is a proton conducting membrane. The catalyst layer of the invention may be deposited onto one or both faces of the proton conducting membrane to form a catalysed membrane. In a further aspect the present invention provides a catalysed membrane comprising a proton conducting membrane and a catalyst layer of the invention.

The membrane may be any membrane suitable for use in a PEMFC, for example the membrane may be based on a perfluorinated sulphonic acid material such as Nafion® (DuPont), Aquivion® (Solvay-Plastics), Flemion® (Asahi Glass) and Aciplex® (Asahi Kasei). Alternatively, the membrane may be based on a sulphonated hydrocarbon membrane such as those available from FuMA-Tech GmbH as the Fumapem® P, E or K series of products, JSR Corporation, Toyobo Corporation, and others. The membrane may be a composite membrane, containing the proton-conducting material and other materials that confer properties such as mechanical strength. For example, the membrane may comprise an expanded PTFE substrate. Alternatively, the membrane may be based on polybenzimidazole doped with phosphoric acid and include membranes from developers such as BASF Fuel Cell GmbH, for example the Celtec®-P membrane which will operate in the range 120° C. to 180°

C. Other components may be added to the membrane, for example to improve the durability, as will be known to those in the art.

In a further embodiment of the invention, the substrate onto which the catalyst layer of the invention is applied is a transfer substrate. Accordingly, a further aspect of the present invention provides a catalysed transfer substrate comprising a transfer substrate and a catalyst layer of the invention. The transfer substrate may be any suitable transfer substrate known to those skilled in the art but is preferably a polymeric material such as polytetrafluoroethylene (PTFE), polyimide, polyvinylidene difluoride (PVDF), or polypropylene (especially biaxially-oriented polypropylene, BOPP) or a polymer-coated paper such as polyurethane coated paper. The transfer substrate could also be a silicone release paper or a metal foil such as aluminium foil. The catalyst layer of the invention may then be transferred to a GDL or membrane by techniques known to those skilled in the art.

A yet further aspect of the invention provides a membrane electrode assembly comprising a catalyst layer, electrode or catalysed membrane according to the invention. The MEA may be made up in a number of ways including, but not limited to:
  (i) a proton conducting membrane may be sandwiched between two electrodes (one anode and one cathode), at least one of which is an electrode according to the present invention;
  (ii) a catalysed membrane coated on one side only by a catalyst layer may be sandwiched between (a) a gas diffusion layer and an electrode, the gas diffusion layer contacting the side of the membrane coated with the catalyst layer, or (b) two electrodes, and wherein at least one of the catalyst layer and the electrode(s) comprises a catalyst layer according to the present invention;
  (iii) a catalysed membrane coated on both sides with a catalyst layer may be sandwiched between (a) two gas diffusion layers, (b) a gas diffusion layer and an electrode or (c) two electrodes, and wherein at least one of the catalyst layer and the electrode(s) comprises a catalyst layer according to the present invention.

The MEA may further comprise components that seal and/or reinforce the edge regions of the MEA for example as described in WO2005/020356. The MEA is assembled by conventional methods known to those skilled in the art.

The catalytic material of the invention may be used in a number of applications, for example in a PEMFC or PAFC and in particular at the cathode (preferably when the first metal is platinum) for the oxygen reduction reaction. The PEMFC or PAFC operates on hydrogen or a hydrogen-rich fuel at the anode or could be fuelled with a hydrocarbon fuel such as methanol. The catalytic material of the invention may also be used at the anode of the PEMFC or PAFC operating on these fuels.

The material of the invention may also be used at the cathode or anode of fuel cells in which the membranes use charge carriers other than protons, for example $OH^-$ conducting membranes such as those available from Tokuyama Soda Ltd., FuMA-Tech GmbH. The material of the invention may also be used in other low temperature fuel cells that employ liquid ion conducting electrolytes, such as aqueous acids and alkaline solutions or concentrated phosphoric acid.

Accordingly, a further aspect of the invention provides a fuel cell, preferably a PEMFC or an anion exchange membrane fuel cell (AEMFC), comprising a catalytic material, catalyst layer, an electrode, a catalysed membrane or an MEA of the invention.

A still further aspect of the invention provides a liquid ion conducting electrolyte fuel cell, such as a PAFC, comprising a catalytic material, catalyst layer or an electrode of the invention.

Furthermore, the material of the invention may also be used as the hydrogen evolution or the oxygen evolution electrode in a PEM electrolyser or electrolyser based on alkaline electrolyte.

The invention will be further illustrated with reference to the following example, which is not limiting of the invention.

Carbon nanofibres produced by the carbonisation of electrospun polymer nanofibres are used as the support material. Suitably polymers include polyacrylonitrile, cellulose and polyimide. The electrospun fibres are less than 200 nm in diameter, ideally less than 100 nm.

An interlayer of titanium nitride is formed by atomic layer deposition using alternating pulses of titanium chloride and ammonia. Depending on the required thickness of the interlayer, 25-500 cycles in total are carried out to form the interlayer.

The thin film catalyst coating using platinum as the first metal and nickel as the second metal is formed by atomic layer deposition. Bis-dimethylamino-2-methyl-2-butoxo-nickel is the source of nickel and methyl-cyclopentadienyl trimethyl platinum (IV) the source of platinum. Pulses of the metal precursors are alternated with pulses of an activating gas selected from ammonia, hydrogen and oxygen or a hydrogen, or other, plasma. A graded structure is produced by varying the relative number of platinum and nickel pulses as deposition progresses. The ratio of nickel pulses to platinum pulses is decreased as the deposition progressed to provide a layer having a lower ratio of nickel:platinum at the outer face of the layer and a higher ratio of nickel:platinum at the inner face of the layer. During the deposition process, the support material is held at elevated temperature between 100-500° C.; 300° C. being typical.

The invention claimed is:

1. A catalytic material comprising:
  (i) a support material; and
  (ii) a thin film catalyst coating having an inner face adjacent to the support material and an outer face, the thin film catalyst coating having a mean thickness of ≤8 nm, wherein
  at least 40% of the support material surface area is covered by the thin film catalyst coating,
  the thin film catalyst coating comprises a first metal selected from the platinum group metals and one or more second metals different to the first metal and are selected from the group consisting of transition metals, rare earth metals, alkali metals, alkaline earth metals, Group IVA metals and Group VA metals, or an oxide thereof,
  the atomic percentage of first metal in the thin film catalyst coating is not uniform through the thickness of the thin film catalyst coating, and
  the atomic percentage of the first metal at the outer face of the thin film catalyst coating is 50-100 at % and wherein the atomic percentage of the first metal at the outer face of the thin film catalyst coating is greater than the atomic percentage of the first metal at the inner face of the thin film catalyst coating.

2. The catalytic material according to claim 1, wherein the first metal is platinum or iridium.

3. The catalytic material according to claim 1, wherein the one or more second metals are selected from the group consisting of chromium, cobalt, nickel, zinc, yttrium, niobium, tin, tantalum, scandium, palladium, iridium, lanthanum, copper, titanium, silver, gold, rhodium, platinum, tungsten, osmium, vanadium, ruthenium, iron, cerium, gadolinium, sodium, potassium, calcium, strontium, lead and bismuth.

4. The catalytic material according to claim 1, wherein there is alloying of the first metal and the one or more second metals.

5. The catalytic material according to claim 1, wherein the support material is a fibre.

6. The catalytic material according to claim 1, wherein the support material is a particulate.

7. The catalytic material according to claim 1, wherein an interlayer is present between the support material and the thin film catalyst coating.

8. The catalytic material according to claim 7, wherein the interlayer is selected from the group consisting of a metal, a metal nitride, a mixed metal nitride, a metal oxide, carbon or boron-doped diamond.

9. The catalytic material according to claim 1, wherein the catalytic material further comprises an additional catalyst component comprising a third and optionally one or more fourth metals.

10. A catalyst layer comprising a plurality of catalytic materials according to claim 1.

11. An electrode comprising a gas diffusion layer and a catalyst layer according to claim 10.

12. A catalysed membrane comprising a proton conducting membrane and a catalyst layer according to claim 10.

13. A catalysed transfer substrate comprising a transfer substrate and a catalyst layer according to claim 10.

14. A membrane electrode assembly comprising an electrode according to claim 11.

15. A fuel cell comprising a catalysed membrane according to claim 12.

16. The catalytic material according to claim 1, wherein the thin film catalyst coating has a mean thickness of $\leq 5$ nm.

17. The catalytic material according to claim 1, wherein at least 90% of the support material surface area is covered by the thin film catalyst coating.

18. The catalytic material according to claim 1, wherein the support material comprises carbon fibre, polybenzimidazole fibre, polyimide fibre, polytetrafluoroethylene fibre, metal oxide fibre, metal nitride fibre, metal carbide fibre or metal fibre.

19. The catalytic material according to claim 1, wherein the catalyst layer has a porosity of $\geq 20\%$.

* * * * *